3,143,534
PREPARATION OF DYEABLE POLYMERS
Elbert C. Herrick, Rosemont, Pa., assignor to Sun Oil Company, Philadelphia, Pa., a corporation of New Jersey
No Drawing. Filed Aug. 12, 1960, Ser. No. 49,132
14 Claims. (Cl. 260—79.3)

This invention relates to solid polymers and more particularly to high molecular weight hydrocarbon polymer derivatives which contain sulfonate groups that impart dyeability to the polymer.

According to the invention, polymers are prepared by reacting an alpha olefin having 2–10 carbon atoms and an alkylatable aromatic hydrocarbon under special conditions such that the olefin polymerizes to form long chain olefinic molecules which then alkylate with the aromatic to yield solid polymers that contain an aromatic nucleus. These polymers are subjected to sulfonating conditions, whereby sulfonic groups that impart dyeability attach to the aromatic rings.

Reaction of the olefin and aromatic to obtain the desired type of polymer requires a catalyst system formed by admixing in the aromatic hydrocarbon (1) a titanium halide which can be $TiCl_3$, $TiCl_4$, $TiBr_3$ or $TiBr_4$, (2) an alkyl aluminum compound which can be an alkyl aluminum dihalide, a dialkyl aluminum halide or an alkyl aluminum sesquihalide wherein the halogen is chlorine or bromine and (3) water in a molar proportion to the aluminum compound in the range of 0.6–1.5, more preferably, 0.7–1.0. The olefin reactant is contacted with this catalyst system at a temperature in the range of 0–50° C., more preferably, 20–45° C. Under these conditions the olefin polymerizes to high molecular weight olefinic intermediates which then alkylate the aromatic reaction medium to yield alkylated aromatic products a portion of which are high molecular weight solid polymers containing aromatic nuclei. The remainder of the alkylation product boils in the lubricating oil range or lower. The solid polymers are then separated from the other alkylation products. The latter can be separated into appropriate fractions by distillation to yield synthetic lubricating oils which have high viscosity indexes.

The starting aromatic hydrocarbon can be benzene or any alkylatable benzene derivative which is liquid at the reaction temperature employed. Examples are toluene, the xylenes, mesitylene, pseudocumene, hemimellitene, prehnitene, isodurene, ethylbenzene, diethylbenzene, isopropylbenzene, amyl benzenes, octyl benzenes, cymene, etc., or mixtures thereof. Generally benzene, toluene and the xylenes are preferred due to availability.

The olefin reactant can be any olefin hydrocarbon having 2–10 carbon atoms per molecule. It is preferred that the olefin be straight chain and ethylene generally is preferred. Branched chain olefins such as isobutylene can be used although they are less desirable. Two or more olefins can be used together to form copolymers which then alkylate the aromatic.

The titanium halide used can be $TiCl_3$, $TiCl_4$, $TiBr_3$ or $TiBr_4$. Titanium tetrachloride is the preferred titanium compound. The aluminum compound can be any alkyl aluminum chloride or bromide having one to two alkyl groups which contain, for example, one to twelve carbon atoms. The aluminum compound can be an alkyl aluminum dihalide, a dialkyl aluminum monohalide or an alkyl aluminum sesquihalide. Examples are methyl aluminum dibromide, ethyl aluminum dichloride, diethyl aluminum chloride, ethyl aluminum sesquichloride, dipropyl aluminum bromide, isobutyl aluminum dichloride, amyl aluminum sesquibromide, dioctyl aluminum chloride, dodecyl aluminum dibromide and the like. Ethyl aluminum sesquichloride is preferred because of availability and cost. The molar ratio of the aluminum compound to the titanium halide can vary from 0.2 to 1.0 and preferably is about 0.3–0.7. The proportion of aluminum compound to the aromatic hydrocarbon can vary widely, for example, in the range of 0.1–20 millimoles per 100 g. of the aromatic.

As previously stated, water must be included in the catalyst system and the molar proportion of water to aluminum should be in the range of 0.6–1.5 and more preferably 0.7–1.0. If the proportion of water is below 0.6, polymerization of the olefin will occur but substantial alkylation of the aromatic with the olefin polymer will not take place. If the molar proportion of water to aluminum exceeds 1.50, the catalyst system loses its activity for promoting both polymerization and alkylation. The exact role of the water in providing the desired catalytic effectiveness is not known with certainly but it is believed to react with the other catalyst components to give a catalytic product that has both alkylating and polymerizing ability.

The temperature at which contact between the olefin and the reaction mixture is effected is in the range of 0–50° C. and more preferably 10–40° C. The contacting should be done with agitation of the reaction mixture. Any pressure can be used from atmospheric up to 500 p.s.i.g. or higher if desired. Since the reaction rate is controlled by diffusion of the olefin into the reaction mixture, an increase in pressure will increase the rate of reaction when the olefin employed is in vapor phase at the operating temperature. At the beginning of the reaction the rate tends to be high and it decreases as the reaction proceeds. The reaction generally is allowed to proceed until the catalyst has lost so much of its activity that an undesirably low rate of reaction results.

After the reaction has been completed, an alcohol such as methanol is added to kill the catalyst, the mixture is filtered to remove the solid polymer and the polymer is washed with a hydrocarbon solvent such as benzene or heptane to remove all of the filtrate phase. The resulting solid polymer generally has a melting point of the order of 120–130° C. Oily products can be obtained from the filtrate by first water washing to remove methanol and catalyst residue and distilling the unreacted aromatic from the hydrocarbon phase.

The solid polymer so obtained is subjected to the action of a sulfonating agent under sulfonating conditions to form sulfonate groups on the aromatic rings. This can be done by reaction of the sulfonating agent with the polymer in powdered form, or the polymer can be dispersed in an inert hydrocarbon carrier, such as heptane, octane, decane or a water white medicinal oil, and the sulfonation can be effected by contacting the dispersion with the sulfonating agent. Suitable sulfonating agents are fuming sulfuric acid and sulfur dioxide. The reaction temperature suitably can be in the range of 20–50° C., although higher temperatures (e.g., 100° C.) can be used if desired. Generally sufficient sulfonating agent should be used to provide at least one sulfonic group for each aromatic ring in the polymer.

Following the sulfonation reaction excess sulfonating agent can be removed from the polymer by water washing. The reaction usually produces a small amount of tarry material which remains with the polymer. This can be removed by washing the polymer with suitable solvents such as benzene, methanol and acetone. The resulting sulfonated polymer product generally has a white to greyish appearance and a melting point of the order of 110–120° C. It can readily be dyed by heating in an aqueous or alcoholic solution of any conventional or suitable dye and the product can be drawn into fibers and film.

The following example illustrates the invention more specifically:

*Example*

A catalyst system was prepared by adding to a closed reactor provided with a stirrer 2360 ml. of benzene, 39.4 ml. of a benzene solution containing 13.68 g. of $TiCl_4$, and 15.2 ml. of a benzene solution containing 4.44 g. of ethyl aluminum sesquichloride. Moisture was present in the catalyst system in an amount in the range of 0.6–1.0 mole per mole of aluminum. The reactor had an ethylene inlet line containing a regulating valve adapted to hold the ethylene pressure in the reactor automatically at 17 p.s.i.g. After allowing the catalyst to age for 20 minutes, ethylene was admitted while the reaction mixture was being stirred and in 5 minutes the temperature rose from 29° C. to 40° C. where it was maintained. The reaction was conducted for 150 minutes by which time the catalyst had lost most of its reactivity. The mixture was removed from the reactor, admixed with methanol and filtered. The solid polymer was washed with methanol and pentane, and 51.2 g. of the solid product were obtained. This product had a melting point of about 123–126° C. In addition there were recovered from the filtrate 365.7 g. of oily polymer having a negligible bromine number and a high viscosity index.

90 g. of solid polymer including that described above plus additional polymer made in another run carried out under the same conditions were dispersed in 3 quarts of white medicinal oil. The mixture was stirred vigorously while 100 ml. (190 g.) of 30% fuming sulfuric acid was added over a time of 103 minutes. The temperature rose from 31° C. to 42° C. Stirring was continued for one additional hour and the temperature maintained itself at 42° C. The mixture was then allowed to stand overnight and a heavy black slurry containing the sulfonated polymer and a small amount of tarry material separated from the oil layer. The bottom layer was removed and filtered, and the residue was washed with benzene, methanol and acetone to remove the tarry material. The sulfonated polymer was then dried in a vacuum oven at 108° C. A total of 109.5 g. of sulfonated product was obtained which had a melting point of about 112–116° C.

One gram of the sulfonated polymer was heated at about 50–60° C. for one hour with a dyeing solution composed of 40 ml. of water, one ml. of a 1% solution of Sevron yellow, one ml. of 0.025% sodium acetate solution and one ml. of 0.01% Ipegon solution. The pH of the mixture had been adjusted with acetic acid to 3.5. When the slurry was filtered, the filtrate obtained was colorless showing that all the dye was taken up by the polymer. The dyeing procedure was repeated twice more with all of the dye again being absorbed. A fourth treatment utilizing twice the amount of dyeing agents gave a light yellow filtrate. The sulfonated polymer increased in color intensity during each dyeing treatment. The final product had a chartreuse yellow color.

I claim:

1. Method of preparing dyeable polymers which comprises contacting an alpha olefin having 2–10 carbon atoms at a temperature in the range of 0–50° C. with a liquid alkylatable benzenoid hydrocarbon free of any olefinic substituent and containing a catalytic mixture of (1) a titanium halide in which the titanium has a valence of at least three and wherein the halogen is selected from the group consisting of chlorine and bromine, (2) an aluminum compound selected from the group consisting of alkyl aluminum dihalides, dialkyl aluminum halides and alkyl aluminum sesquihalides wherein the halogen is selected from the group consisting of chlorine and bromine, and (3) water in a molar proportion to said aluminum compound in the range of 0.6–1.5, the molar proportion of the aluminum compound to the titanium halide being in the range of 0.2–1.0, separating from the reaction mixture solid polymers composed of long alkyl chains attached to aromatic rings, forming a slurry of said polymers in an inert liquid reaction medium, treating the resulting mixture with a sulfonating agent under sulfonating conditions, and recovering sulfonated polymers from the reaction mixture.

2. Method according to claim 1 wherein the titanium halide is $TiCl_4$.

3. Method according to claim 2 wherein the aluminum compound is ethyl aluminum sesquichloride.

4. Method according to claim 3 wherein the olefin is ethylene and the aromatic hydrocarbon is selected from the group consisting of benzene, toluene and xylene.

5. Method according to claim 4 wherein said temperature is in the range of 20–45° C. and the proportion of aluminum compound to alkyl aluminum halide is in the range of 0.3 to 0.7.

6. Method according to claim 1 wherein said temperature is in the range of 20–45° C. and the proportion of aluminum compound to alkyl aluminum halide is in the range of 0.3 to 0.7.

7. Method according to claim 6 wherein the titanium halide is $TiCl_4$ and the aluminum compound is ethyl aluminum sesquichloride.

8. Method according to claim 7 wherein the molar proportion of water to the aluminum compound is in the range of 0.7–1.0.

9. Method according to claim 1 wherein the olefin is ethylene and the aromatic hydrocarbon is selected from the group consisting of benzene, toluene and xylene.

10. Method according to claim 1 wherein said sulfonating agent is fuming sulfuric acid.

11. A dyeable polymer prepared according to the method of claim 1.

12. Method of preparing dyeable polymers which comprises contacting an alpha olefin having 2–10 carbon atoms at a temperature in the range of 10–40° C. with a liquid alkylatable benzenoid hydrocarbon free of any olefinic substituent and containing a catalytic mixture of (1) a titanium halide in which the titanium has a valence of at least three and wherein the halogen is selected from the group consisting of chlorine and bromine, (2) an aluminum compound selected from the group consisting of alkyl aluminum dihalides, dialkyl aluminum halides and alkyl aluminum sesquihalides wherein the halogen is selected from the group consisting of chlorine and bromine, and (3) water in a molar proportion to said aluminum compound in the range of 0.6–1.5, the molar proportion of the aluminum compound to the titanium halide being in the range of 0.2–1.0 and the amount of the aluminum compound being in the range of 0.1–20 millimoles per 100 g. of said benzenoid hydrocarbon, and separating from the reaction mixture solid polymers composed of long alkyl chains attached to aromatic rings, forming a slurry of said polymers in an inert liquid reaction medium, treating the resulting mixture with a sulfonating agent under sulfonating conditions, and recovering sulfonated polymers from the reaction mixture.

13. Method according to claim 12 wherein the titanium halide is $TiCl_4$ and the aluminum compound is ethyl aluminum sesquichloride.

14. Method according to claim 13 wherein the olefin is ethylene and the aromatic hydrocarbon is selected from the group consisting of benzene, toluene and xylene.

References Cited in the file of this patent

UNITED STATES PATENTS

| | | |
|---|---|---|
| 2,513,180 | Kemp | June 27, 1950 |
| 2,604,461 | Roth | July 22, 1952 |
| 2,802,812 | Overberger | Aug. 13, 1957 |
| 2,872,437 | Gilbert | Feb. 3, 1959 |
| 2,973,348 | Coover et al. | Feb. 28, 1961 |
| 3,014,016 | Natta et al. | Dec. 19, 1961 |
| 3,050,503 | Natta et al. | Aug. 21, 1962 |
| 3,079,218 | Guilio et al. | Feb. 26, 1963 |